Jan. 1, 1952  J. F. WALKER  2,581,314
LUBRICATING APPARATUS
Filed March 27, 1947  2 SHEETS—SHEET 1

Inventor:
Jerome F. Walker.
By Hinkle, Horton, Ahlberg, Hanamann & Wupper
Attorneys.

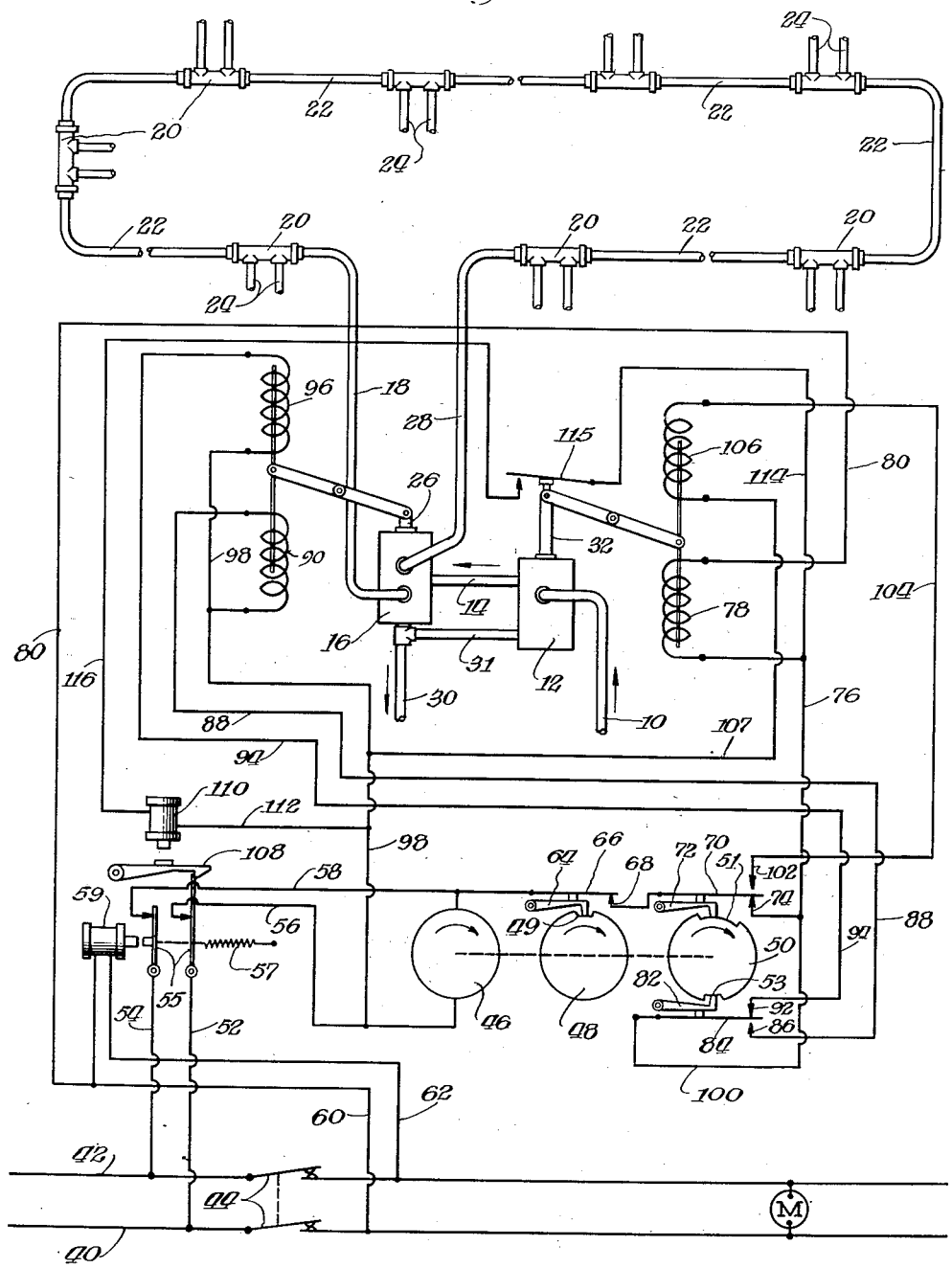

Patented Jan. 1, 1952

2,581,314

UNITED STATES PATENT OFFICE 2,581,314

LUBRICATING APPARATUS

Jerome F. Walker, Victor, N. Y., assignor to Stewart-Warner Corporation, Chicago, Ill., a corporation of Virginia Application March 27, 1947, Serial No. 737,559

19 Claims. (Cl. 184—7)

1

This invention relates to automatic centralized lubricating systems which usually include a series of measuring valves by which lubricant is delivered to serve bearings of a machine or apparatus and which are all periodically actuated under control of a timing device.

One object of the invention is to provide a new and improved control mechanism for a centralized lubricating system.

Another object of the invention is to provide a new and improved control mechanism for a lubricating system adapted to serve the bearings of a machine or apparatus at predetermined intervals and to initiate such lubrication whenever the machine is started after being shut down for a period longer than one of said intervals.

It is also an object of the invention to provide a control mechanism for an automatic lubricating system adapted to dispense lubricant to the machine which it serves when the machine is placed in operation and at predetermined intervals thereafter, but not necessarily upon every instance of the stopping and starting of the machine, said system including means to prevent the automatic lubrication of the machine at shorter intervals than the regular predetermined intervals at which the system normally operates.

More specifically, it is an object of the invention to provide a new and improved control mechanism for a lubricating system adapted to be actuated at predetermined intervals to furnish lubricant to the bearings of a machine or apparatus, said mechanism including an electrically driven clock and cam means driven thereby together with switch mechanism controlling actuation of the system and a switch for the clock which is automatically locked in closed position when the machine or apparatus is started, together with means which prevents the clock switch from being unlocked and opened during a period of actuation of the system even though the machine may have been stopped before completion of the lubricating operation.

Other objects and advantages of the invention will appear from the following description taken in connection with the drawings, in which:

Fig. 3 is a diagrammatic view showing the application of the control mechanism to a lubricating system of the dual line type.

2

Figure 1:
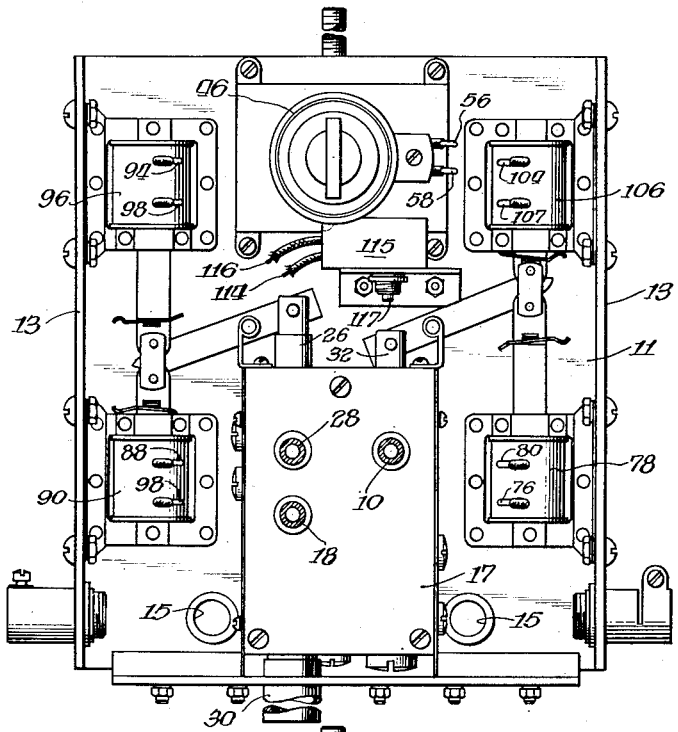
Fig. 1 is a front elevation showing control mechanism to operate a centralized lubricating system in accordance with this invention, said mechanism being mounted on a supporting panel.

In the various types of centralized lubricating systems the lubricant is distributed under pressure to a plurality of bearings or other surfaces requiring lubrication and such distribution occurs intermittently but preferably at regular intervals. In these systems, the bearings or other lubrication points are fitted with measuring valves, and these valves are connected together by conduits through which the lubricant is supplied. Then by application of pressure to the lubricant in the connecting conduits, the measuring valves are actuated to discharge measured quantities of lubricant to the individual bearings.

In many cases such a centralized system is confined to a single machine. When the machine is standing idle, it does not require the frequent lubrication furnished by the system when the machine is running; hence the system may be arranged to be shut off automatically when the machine is shut down. But since it may stand idle for a considerable period, it is desirable that the machine be lubricated as soon as it is started after such an idle period, to guard against injury to bearings which may be dry. On the other hand, it is not practicable to have the lubricating system automatically actuated to deliver lubricant each time the machine is stopped and started in the course of its normal operation. That would be likely to cause lubrication at too frequent intervals.

The present invention therefore provides an automatic system which lubricates the machine at regular, predetermined intervals during a working period under control of a clock or timer and cams driven by the clock for actuating the system. The cams determine the intervals at which the system shall perform its lubricating cycle and also the duration of each cycle. The timer is so arranged that it can be stopped only at the end of an interval between operating cycles of the lubricating system, that is, with the cams positioned to initiate such a cycle. It results that if the machine is shut down in an interval between lubricating cycles, the timer will continue to run for the remainder of the interval and will then be automatically stopped with the system conditioned to start lubricating the machine whenever the machine is started again.

The present invention also provides means to prevent stopping the timer and interrupting the operation of the system during a lubricating cycle. If the machine should be stopped at such a time, the system would complete the cycle of lubrication and thereafter the timer would continue to run for one full interval so as to re-set the cams preparatory to lubricating the machine when it is again started. If the machine should be started in this interval the lubrication system would simply continue to operate at its regular intervals. In other words, the invention insures that lubrication shall be supplied to the machine when it is placed in operation and at regular intervals thereafter, but makes it impossible for the machine to be automatically lubricated at shorter intervals, regardless of how often the machine is stopped and started.

In most cases the clock or timer which controls the lubricating system is driven electrically as by a synchronous motor; if the machine also includes an electric driving motor, the machine motor and the timer motor may be connected to the same source of current and may be under control of the same switch to provide for starting the lubrication system simultaneously with the starting of the machine. This is the arrangement shown in the illustrative system disclosed herein.

Referring first to Figure 3, the lubricating system included in the diagram is of the dual line type in which the measuring valves are connected in a closed series or loop which extends from the source of lubricant under pressure and returns to it so that the pressure may be applied through the series in either direction. In such a system, each measuring valve is filled by the application of lubricant under pressure in one direction and is then discharged when the pressure is applied in the opposite direction. A complete operating cycle therefore consists in the application of pressure first in one direction, causing each of the valves to deliver a charge of lubricant previously acquired, and at the same time re-filling another chamber of the valve with lubricant, and then completing the operation by reversing the pressure through the system to cause each of the valves to deliver the charge of lubricant just acquired and to be re-filled for a subsequent operation. Since each valve delivers two charges of lubricant in each operating cycle of the system, such a valve may have connections to two different bearings to be lubricated successively during the cycle, or both connections may run to a single bearing of a type requiring more lubrication than a single charge would provide.

In Fig. 3 the pipe or conduit 10 may be understood as a supply line leading from a source of lubricant under pressure. This conduit is connected into a valve 12 from which a feed conduit 14 leads to a reversing valve 16 which controls the direction in which the lubricant is fed through the system. From the valve 16 a feed pipe 18 connects with the measuring valves 20 which are arranged in a continuous closed series in which they are connected by conduits consisting of lengths of tubing 22. Each of the measuring valves is shown with a pair of outlet tubes 24 which may lead to the various bearings to be lubricated. When the lubricant is fed into the valves 20 through the pipe 18, as it is when the valve member 26 is shifted to its lower position as shown in Fig. 3, the return flow reaches the valve body 16 through the pipe 28; and when the valve member 26 is shifted upwardly to its alternative position, the flow proceeds outwardly through the pipe 28, thence through the series of measuring valves 20 and back by way of the pipe 18. In either case the return flow is vented back to the supply through a pipe 30 and this vent pipe is also connected by a conduit 31 with the control valve 12. The control valve 12 has a valve member 32. When the valve member 32 is disposed at its upper limit of movement as shown in Fig. 3, the lubricant under pressure supplied through the pipe 10 is connected with the system through the conduit 14 and reversing valve 16, but when the valve member 32 is shifted downwardly the supply line 10 is vented back to the source of supply through the conduit 31 and vent pipe 30.

The valves 12 and 16 are arranged to be actuated at predetermined intervals under the control of an electrical system, and the arrangement shown in Fig. 3 assumes that the same source of electric current is utilized for operating the motor which drives the machine and for actuating the devices of the control system. The feed wires 40 and 42 may be understood as supplying current from a suitable source such as a generator, not shown, and are connected directly to the motor M which drives the machine. This connection is controlled, however, by a double pole switch 44 interposed in the current supply line for stopping and starting the motor M as desired. The control system includes a constant speed motor 46 preferably of the synchronous type, if the current supplied by the lead wires 40, 42 is alternating current, and since the motor 46 may be similar to that employed in an electric clock and is to serve as a timer for actuating the lubricating system at regular intervals, it is hereinafter referred to as the "clock" of the system. This clock 46 drives a frequency cam 48 and a duration cam 50, the frequency cam 48 being geared for example to make one revolution in twenty-four hours and the duration cam being arranged to revolve once an hour like the minute hand of a clock.

Current for operating the clock motor 46 is provided by lead wires 52 and 54 which are connected to the lead wires 40 and 42, respectively, at a point between the source of current supply and the control switch 44, so that under certain conditions the clock 46 may continue to run even after the switch 44 has been opened to stop the machine motor M. The conductors 52 and 54 are connected to the clock 46 through a relay switch 55 and conductors 56 and 58. The switch 55 is shown with a spring 57 which holds it normally open until the relay coil 59 is energized through its lead wires 60 and 62 which are connected to the current supply line at a point between the switch 44 and the machine motor M. The coil 59 is thus energized when the switch 44 is closed to start the machine motor, and the switch 55 is thus closed to start the clock motor 46.

The frequency cam 48 and the duration cam 50 may be similar to those of the timing mechanism disclosed in the copending application of Ruben Wedeberg, Serial No. 12,807, filed March 3, 1948, now Patent No. 2,545,719, each of them being in the form of a disc having peripheral notches or recesses for actuating electric switches. By means of adjustable masking discs associated with the cam discs, as more fully explained in said Wedeberg application, the effective number of notches in one of them can be varied to determine the intervals at which lubricant will be supplied through the system and one of several notches in the other disc may be selected to determine the duration of each cycle of operation. In the diagrammatic representation in Fig. 3 herewith the frequency cam 48 is shown with a single notch 49, and the duration cam 50 is shown with two notches 51 and 53 which will serve for purposes of illustration, but it may be understood that in most instances the frequency cam 48 will have more than one notch so as to supply lubrication at intervals of one hour or two hours or longer, as may be required, and that if desired the cam 48 may be geared to rotate more than once in twenty-four hours so as to operate the system at shorter intervals.

As will be more fully explained hereinafter, the control system is so arranged that whenever the clock 46 is stopped the cam 48 will be positioned with its notch 49 registered with the follower 64 which actuates the switch 66. The arm of switch 66 then engages its contact 68 which is connected to the arm of switch 70 controlled by the duration cam 50. The duration cam 50 will also be standing initially with its notch 51 registered with the follower 72 so that the switch arm 70 engages the lower contact 74 from which the conductor 76 leads to the solenoid coil 78. The return conductor 80 extends from the coil 78 to conductor 60 and thence to the lead wire 40, completing the circuit for the solenoid. This causes the valve member 32 to be shifted to its upper position as shown in Figure 3, thus opening the lubricant pressure line 10 through the conduit 14. In the initial portion of the lubrication cycle the follower 82 will ride on the circular periphery of the duration cam 50 and in that position the switch arm 84 engages its contact 86 from which conductor 88 leads to the solenoid 90. This causes the valve member 26 to be shifted to its upper position in which lubricant feeds through the pipe 28 into the system of measuring valves 20 and returns through the pipe 18 to the vent 30. At about the middle of the lubrication cycle the follower 82 drops into the notch 53 of the duration cam 50 thus causing the switch arm 84 to engage the contact 92 from which the conductor 94 leads to solenoid 96. The solenoid 90 is thus de-energized and solenoid 96 operates to shift the valve member 26 to its lower position in which it is shown in Figure 3. This reverses the flow of lubricant through the measuring valves 20 causing it to feed out from the valve 16 through the pipe 18 and to return by way of the pipe 28. The return wire 98 serves both solenoids 90 and 96 and connects with the conductor 56, switch 55, conductor 52 and lead wire 40.

The switch arm 84 which controls operation of the solenoids 90 and 96 is connected by a conductor 100 to the contact 74 of the other switch which is actuated by the duration cam 50. At the completion of the lubrication cycle the follower 72 rides out of the notch 51 and the switch arm 70 disengages contact 74, thus leaving the circuits of solenoids 90 and 96 open; at the same time the switch arm 70 engages contact 102 which is connected by a conductor 104 with the solenoid coil 106 and return wire 107; the solenoid 106 thus energized actuates the valve member 32 and shifts it to its lower position in which it cuts off the connection through conduit 14 and vents the lubricant pressure through return pipe 30. This concludes the lubricating operation; the clock 46 continues to run and when the notch 49, or any one of the effective notches of the frequency cam 48 again registers with the follower 64, the cycle is repeated.

If the switch 44 should be opened for stopping the machine motor M during a lubrication cycle—that is, while the valve member 32 is at its upper position as shown in Figure 3—the clock 46 will not be stopped immediately because it is fed by conductors 52 and 54 which are connected to the feed wires 40 and 42 at a point back of the switch 44. The relay switch 55 will be held closed by the automatic latch 108 which can be released only by means of the magnet coil 110. One terminal of this release coil 110 is connected by a conductor 112 to the conductor 98 and through it to conductor 56 which feeds the clock 46. But the other terminal of the coil 110 can be energized only through the conductors 114 and 116 which are connected by a switch 115. Said switch is held open by the valve member 32 when the latter is in its upper position and thus prevents the release coil 110 from being energized during a lubricating cycle, since the valve member 32 must remain in this position as long as lubricant is being fed to the measuring valves 20 in either direction.

If at the termination of the lubricating cycle the switch 44 is still open, the closing of switch 115 by the shifting of the valve member 32 to its lower position prepares this portion of the circuit for the energizing of the release coil 110. However, since at the termination of the lubricating cycle the switch arm 70 is disengaged from the contact 74, the coil 110 cannot be energized until the clock has driven the cams 48 and 50 through a distance representing the interval between lubrication cycles so that the followers 64 and 72 have dropped into the notches of the respective cams closing switch 66 and shifting switch arm 70 into engagement with contact 74. Ordinarily this would start another lubrication cycle, but, with the switch 44 standing open, the return circuit of the solenoid 78 by way of the conductor 80 and conductor 60 is incomplete so that the solenoid 78 is not energized and the valve member 32 is not shifted to its open position. Also, with the switch 44 standing open, the holding coil 59 of the relay switch 55 is not energized, hence the energizing of the release coil 110 lifts the latch 108, permitting the switch 55 to open, immediately stopping the clock motor 46 and arresting the cams at the positions corresponding to the beginning of a new lubricating cycle. Thus, when the machine is again started up by closing the switch 44, energizing relay coil 59 and starting the clock 46, the lubrication will proceed immediately before any damage can be done to the machine.

Of course if the machine control switch 44, having been opened in the midst of a lubrication cycle should be reclosed before termination of the cycle, the clock 46 would continue to operate without interruption and the machine would continue to be lubricated at regular intervals determined by the frequency cam 48, all circuits having been reestablished by the closing of the switch 44.

On the other hand, if the machine motor M should be stopped temporarily by opening the switch 44 in the interval between lubrication cycles, the clock 46 would continue to run, since between cycles switch 66 is open and the follower 72 rides on the circular periphery of the cam 50 and holds the switch arm 70 away from the contact 74 through which the release coil 110 must be energized. The coil 110, therefore, will not operate to lift the latch 108 for opening the relay switch 55 until the cams 48 and 50 have been driven around to the position corresponding to the beginning of a new lubrication cycle.

From the foregoing description it will be seen that this control system provides that, (a) lubrication of the machine will commence whenever the machine is started up after a shut-down period of any considerable duration; (b) lubrication will be furnished automatically at regular, predetermined intervals as long as the machine is in substantially continuous service, but not at shorter intervals, regardless of how often the machine is stopped and started; and (c) if the machine is shut down while the lubricating operation is in progress, the cycle will be completed, and the timer will not be shut off until it has conditioned the system to start lubrication as soon as the machine is again placed in service.

Figure 2:
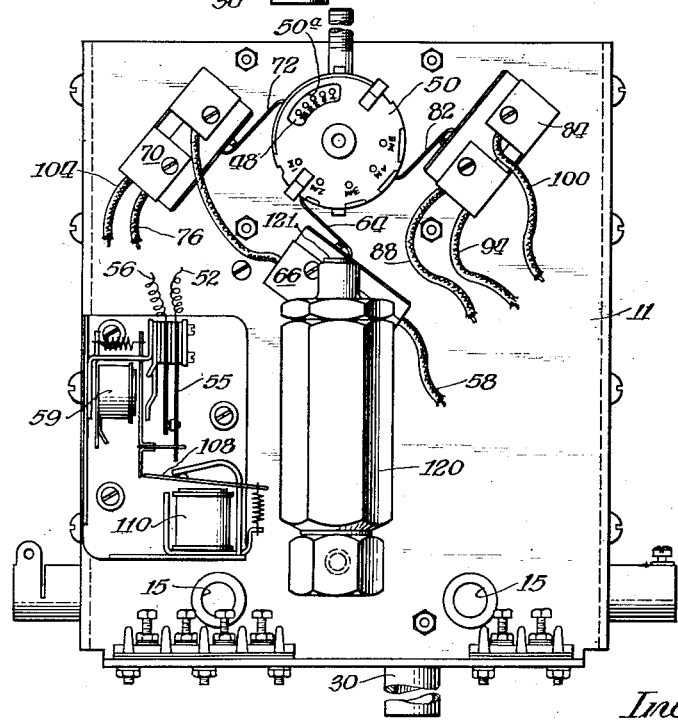
Fig. 2 is a rear elevation of the panel showing parts of the mechanism mounted thereon.

Figures 1 and 2 illustrate the various units of the control mechanism as mounted on a supporting panel 11. The panel is formed with side flanges 13 to which the frames of the solenoids 78, 106, 90 and 96 are bolted. The valve bodies which are shown separately at 12 and 16 in Fig. 3 are combined in a single block 17 mounted between the two pairs of solenoids. Fragments of the pipes 10, 18 and 28 are shown in section, and fragments of the various conductor wires are shown extending from the solenoids and from the switches 66, 70 and 84. Switch 115 is shown with an actuating plunger 117 positioned to be engaged by the valve member 32 whenever the latter moves to its upper position.

The clock 46 is seen in Fig. 1, attached to one face of the panel 11; the cams which it drives are disposed on the opposite face with the switches, but since the cams are coaxially mounted, the duration cam 50 overlies and hides the frequency cam 48 except the area thereof which is seen through a window 50a in the cam 50. One switch arm 55 of the locking relay is seen in Fig. 2, the other switch arm being hidden thereby. The locking coil 59, latch arm 108, and release coil 110 are clearly seen in this view. Near its lower edge the panel 11 is formed with apertures 15, preferably fitted with bushings or grommets of insulating material, so that the circuit wires from the switches may be led through these openings for connection to the solenoid coils on the opposite face of the panel. Incidentally, Fig. 2 includes a pressure indicator 120 which is connected into the supply line within the valve body 17 and having a plunger 121 to be protruded by pressure; this plunger can be variously utilized either to indicate that sufficient pressure is being supplied or to actuate a warning signal in the event of the failure of pressure or exhaustion of the supply of lubricant. The latter use of such a device is described in the Wedeberg application above referred to, but forms no part of the present invention.

While there is shown and described herein a combination of certain devices and mechanisms embodying the invention and illustrative thereof, it will be understood that the invention is not limited thereto or thereby but includes all modifications, variations and equivalents which may come within the scope of the appended claims. For example, instead of controlling the current supply to the relay coil 59 by the machine motor switch 44, a separate switch might be provided for said coil 59 and arranged to be actuated by any convenient moving part of the machine; such an arrangement would permit operation of the machine itself from any source of power, electrical or otherwise and would emphasize the fact that the lubrication control herein disclosed is not limited to operation from the same source of electric current as the machine to be lubricated, and is not limited to use with electrically driven machinery.

I claim:

1. In combination with a machine, a lubricating system therefor which includes a series of measuring valves each adapted to deliver lubricant in response to pressure applied to the valve, conduit means connecting said valves, a supply of lubricant under pressure, an electrically actuated control valve governing the connection of said supply with said measuring valves, electrically operated timing mechanism comprising a clock, cam means driven by the clock, switch means controlling said control valve and actuated by said cam means, a source of electrical energy, a circuit connecting the switch means and the control valve, said switch means being adapted to be actuated by said cam means for rendering the lubricating system operative at predetermined intervals and through a predetermined cycle, a locking relay operable to energize said clock and said circuit from said energy source, means whereby the starting of said machine operates said relay, and release means operative to unlock said relay only upon completion of an operating cycle of the system.

2. In combination with a machine, a lubricating system therefor which includes a series of measuring valves each adapted to deliver lubricant in response to pressure applied to the valve, conduit means connecting said valves, a supply of lubricant under pressure, an electrically actuated control valve governing the connection of said supply with said measuring valves, electrically operated timing mechanism comprising a clock, cam means driven by the clock, switch means controlling said control valve and actuated by said cam means, a source of electrical energy, a circuit including said control valve and said switch means, said switch means being adapted to be actuated by said cam means for rendering the lubricating system operative at predetermined intervals and through a predetermined cycle, a locking relay operable to energize said clock and said circuit from said energy source, means including an electromagnet for operating said relay when the machine is started, electromagnetic release means for unlocking said relay, a circuit by which said release means is adapted to be connected with the energy source, a switch in said last mentioned circuit, and means operative to hold said switch open whenever said control valve is positioned to connect the measuring valves with the lubricant supply.

3. In the combination defined in claim 2, said means to hold said switch open being a movable member of said electrically actuated control valve.

4. In combination with a machine, a lubricating system therefor which includes a series of measuring valves each adapted to deliver lubricant in response to pressure applied to the valve, conduit means connecting said valves, a supply of lubricant under pressure, an electrically actuated control valve governing the connection of said supply with said measuring valves, electrically operated timing mechanism comprising a clock, cam means driven by the clock, switch means controlling said control valve and actuated by said cam means, a source of electrical energy, circuits which include said clock, said switch means and said energy source for energizing said clock and said switch means from said energy source, said switch means being adapted to be actuated by said cam means for rendering the lubricating system operative at predetermined intervals and through a predetermined cycle, a switch for said clock, latch means adapted to lock said switch in closed position, means whereby said switch is closed upon the starting of the machine, and means operative to release said latch means only upon completion of an operating cycle of the system.

5. In combination with a machine, a lubricating system therefor, a supply of lubricant under pressure, electrically actuated control valve means arranged to connect said supply with the system, electrically operated timing mechanism comprising a clock, cam means driven by the clock, switch means controlling said valve means and actuated by said cam means for rendering the lubricating system operative at predetermined intervals and through a predetermined lubricating cycle, a source of electrical energy, a circuit including said switch means and said valve means, a locking relay through which said clock and said circuit are connected with said energy source, means whereby the starting of said machine closes said relay, and release means operative to unlock said relay only upon completion of an operating cycle of the system.

6. In combination with a machine motor, a lubricating system therefor, a supply of lubricant under pressure, electrically actuated control valve means arranged to connect said supply with the system, electrically operated timing mechanism comprising a clock, cam means driven by the clock, switch means controlling said valve means and actuated by said cam means for rendering the lubricating system operative at predetermined intervals and through a predetermined lubricating cycle, an electrical power line connected to the machine motor, a main switch in said power line operable at will to start and stop the machine motor, a relay switch to supply operating current to said clock, a relay magnet connected to the power line between said main switch and the machine motor for closing the relay switch and starting the clock when said machine motor is started, conductor means extending from the power line to said relay switch at the other side of said main switch, an automatic locking means to hold the relay switch closed independently of the relay magnet, whereby the clock continues to run when the machine motor is stopped.

7. In the combination defined in claim 6, a release magnet for said locking means and a circuit for said magnet controlled by the cam means and adapted to be closed thereby only after said control valve has been closed and the clock has driven said cam means into position for initiating the next lubricating cycle.

8. In the combination defined in claim 6, a release magnet for said locking means and a circuit for said magnet controlled by the cam means and adapted to be closed thereby only after said control valve has been closed and the clock has driven said cam means into position for initiating the next lubricating cycle, the circuit for the electrically actuated control valve means including a connection to the power line between the main switch and the machine motor, whereby said circuit is incomplete when said motor is shut down and said next lubricating cycle will not commence until the machine motor is started.

9. In combination with a machine, a lubricating system therefor, a supply of lubricant under pressure, electrically actuated control valve means arranged to connect said supply with the system, electrically operated timing mechanism comprising a clock, cam means driven by the clock, switch means controlling said valve means and actuated by said cam means, a source of electrical energy, circuits which include said clock, said switch means and said energy source for energizing said clock and switch means from said energy source, said switch means being adapted to be actuated by said cam means for rendering the lubricating system operative at predetermined intervals and through a predetermined lubricating cycle, a driving motor for said machine, conductors constituting a current supply line from said energy source to said motor, a control switch in said line to stop and start the motor, said circuits including a connection for the clock extending down a part of said line between the energy source and said control switch, a relay switch for the clock interposed in said connection, said relay switch including a magnet coil and lead wires therefor connected to said line between the motor and its control switch to be energized for closing the relay switch when the machine motor is started, means automatically locking said relay switch in closed position, and electromagnetic release means for unlocking the relay switch operable only upon completion of an operating cycle of the lubricating system.

10. In the combination defined in claim 9, said circuits including conductor means for said electromagnetic release means, a switch interposed in said conductor means, and means actuated by said control valve to hold said switch open whenever said control valve is positioned to connect the system with the lubricant supply.

11. In combination with a machine, a lubricating system therefor, a supply of lubricant under pressure, electrically actuated control valve means arranged to connect said supply with the system, electrically operated timing mechanism comprising a clock, a frequency cam and a duration cam both driven by the clock and switch means controlling said valve means and actuated by said cams, a source of electrical energy, circuits which include said clock, said switch means and said energy source for energizing said clock and switch means from said energy source, said frequency cam being adapted to actuate said switch means for conditioning said circuits for energization at predetermined intervals and said duration cam being adapted to actuate said switch means for shifting the control valve to admit lubricant under pressure to the system and determining the duration of a lubricating cycle, a locking relay switch through which said clock is adapted to be connected with said energy source, means whereby the starting of the machine closes said relay switch, and release means operative to unlock said relay switch only upon completion of an operating cycle of the system and after further movement of the frequency cam to a position in which its switch means is closed, whereby the clock is stopped with the system conditioned for performing a lubricating cycle promptly upon the starting of said machine.

12. In combination with a machine, a lubricating system therefor, a supply of lubricant under pressure, electrically actuated control valve means arranged to connect said supply with the system, electrically operated timing mechanism comprising a clock, cam means driven by the clock, switch means controlling said valve means and actuated by said cam means for rendering the lubricating system operative at predetermined intervals and through a predetermined lubricating cycle, a source of electrical energy circuits which include said clock, said switch means and said energy source for energizing said clock and switch means from said energy source, a switch through which said clock is connected with said energy source, means whereby the starting of the machine closes said switch, and means automatically locking said switch closed and releasable only when the said control valve means is closed.

13. In combination with a machine, a lubricating system therefor, a supply of lubricant under pressure, electrically actuated control valve means arranged to connect said supply with the system, electrically operated timing mechanism comprising a clock, cam means driven by the clock, switch means controlling said valve means and actuated by said cam means for rendering the lubricating system operative at predetermined intervals and through a predetermined lubricating cycle, a source of electrical energy, circuts which include said clock, said switch means and said energy source for energizing said clock and switch means from said energy source, a switch through which said clock is connected with said energy source, means whereby the starting of the machine closes said switch, and means automatically locking said switch closed and releasable only after said control valve means has been closed and the clock has driven said cam means into position for initiating the next lubricating cycle.

14. In combination with a machine, a lubricating system therefor which includes a series of measuring valves each adapted to deliver lubricant in response to pressure applied to the valve, conduit means connecting said valves, means for supplying lubricant under pressure to said system, electrically actuated control means governing the connection of said means for supplying lubricant with said measuring valves, electrically operated timing mechanism, cam means driven by the timing mechanism, switch means controlling operation of said control means and actuated by said cam means, a source of electrical energy, a circuit for energizing said timing mechanism from said source of energy, a circuit including said switch means and said control means for energizing the latter from said source, said switch means being adapted to be actuated by said cam means for rendering the lubricating system operative at predetermined intervals and through a predetermined cycle, means initially to control energization of said timing mechanism from said circuit including a relay, a circuit for said relay automatically closed when operation of said machine is intiated and automatically opened upon interruption in the operation of said machine, and means independent of said relay effective once said timing mechanism has been energized to continue operation thereof for the duration of the cycle of the timing mechanism irrespective of whether or not said machine is operating.

15. In combination with a machine, a lubricating system therefor, means for supplying lubricant under pressure to said system, electrically actuated control means arranged to connect said means for supplying lubricant with the system, electrically operated timing mechanism, cam means driven by said timing mechanism, switch means controlling said control means and actuated by said cam means for rendering the lubricating system operative at predetermined intervals and through a predetermined lubricating cycle, a source of electrical energy and a circuit for energizing said timing mechanism from said source of energy, a circuit including said switch means and control means for energizing the latter from said energy source, a relay to control energization of the circuit for said timing mechanism, a circuit for said relay adapted to be closed when operation of said machine is initiated, and means rendered effective each time the circuit for said timing mechanism is energized to maintain said timing mechanism in operation throughout a complete cycle of operation of the timing mechanism irrespective to interruptions in the operation of said machine, said means being rendered ineffective to continue operation of said timing mechanism at the end of its cycle should said machine then be idle.

16. In combination with a machine, a lubricating system therefor, means for supplying lubricant under pressure to the system, electrically actuated control means for controlling flow of lubricant from the supply means to said system, electrically operated timing mechanism, cam means driven by said timing mechanism, switch means controlling said control means and actuated by said cam means for rendering the lubricating system operative at predetermined intervals and through a predetermined lubricating cycle, a source of electrical energy, a circuit including said switch means for energizing said control means from said energy source, circuit means for energizing said timing mechanism from said energy source, a switch in the said circuit means, a relay for closing said last mentioned switch, a circuit for energizing said relay from said energy source adapted to be closed when said machine is operating, means independent of said relay for maintaining the circuit means to said timing mechanism closed for the full cycle of operation of the timing mechanism irrespective of interruptions in the operation of said machine, and means operating in response to the movement of said cam means to starting position to open the circuit means for said timing mechanism should said machine then be idle.

17. A lubricating system for a machine comprising means for supplying lubricant under pressure to the system, electrically actuated means for controlling connection of the system to the means for supplying lubricant under pressure, a source of electric current, a circuit controller operable to energize said control means and initiate flow of lubricant through the system at predetermined intervals and for predetermined periods of time alternately in opposite directions, a circuit for said circuit controller, means for closing said circuit whenever the machine is started to energize the circuit, means for maintaining said circuit closed until the beginning of the next of said intervals irrespective of the operation of said machine, means for releasing said last mentioned means to open the circuit of said circuit controller, a circuit for said releasing means including a switch moved to closed position when said control means operates to discontinue flow of lubricant to the system, and a second switch operated to close said release circuit, should said machine be idle when said circuit controller returns to starting position.

18. Apparatus operable from an electric power source for controlling the lubrication of a machine having a lubricating system operable by a pressure source of lubricant, comprising the combination of electrically operable valve means for controlling connection of the pressure source with the lubricating system, an electrically operable timer, a first input circuit for connecting the apparatus with the electric power source irrespective of operation of the machine, a second input circuit for connecting the apparatus with the electric power source only when the machine is operating, a locking relay including a switch for connecting the timer with the first input circuit, means forming a part of the relay and connected with the second input circuit for closing the relay switch whenever the machine is operating, switching means operable by the timer and connected with the valve means and the relay switch for operating the valve means at predetermined intervals to carry out a lubricating cycle of predetermined duration, means forming a part of the relay for locking the relay switch closed to operate the timer throughout one of said intervals, a release switch operable in response to disconnection of the lubricating system from the pressure source by the valve means, and releasing means conjointly controlled by the switching means and the release switch and including a circuit connecting the switching means and the release switch for rendering the relay locking means ineffective when the release switch is operated concurrently with operation of the switching means by the timer to a position for commencing the next lubricating cycle, the relay switch thereupon being opened to stop the timer if the machine is not operating.

19. Apparatus operable from electric power source for controlling the lubrication of a machine having a lubricating system including electrically controllable means for supplying lubricant under pressure to the system, comprising the combination of an electrically operable timer, a first input circuit for connecting the apparatus with the electric power source irrespective of operation of the machine, a second input circuit for connecting the apparatus with the power source only when the machine is operating, a locking relay including a switch for connecting the timer with the first input circuit, means forming a part of the relay and connected with the second input circuit for closing the relay switch whenever the machine is operating, switching means operable by the timer and a circuit for connecting the switching means with the relay switch and the electrically controllable means of the lubricating system for operating the lubricating system at predetermined intervals to carry out a lubricating cycle of predetermined duration, means forming a part of the relay for locking the relay switch closed to operate the timer throughout one of said intervals, a release switch operable in response to discontinuation of operation of the lubricating system, and releasing means conjointly controlled by the switching means and the release switch and including a circuit connecting the switching means and the release switch for rendering the relay locking means ineffective when the release switch is operated concurrently with operation of the switching means by the timer to a position for commencing the next lubricating cycle, the relay switch thereupon being opened to stop the timer if the machine is not operating.

JEROME F. WALKER.

REFERENCES CITED

The following references are of record in the file of this patent:

UNITED STATES PATENTS

| Number | Name | Date |
|---|---|---|
| 2,048,003 | Hawks | July 21, 1936 |
| 2,339,532 | Venable | Jan. 18, 1944 |